United States Patent Office  3,524,894
Patented Aug. 18, 1970

3,524,894
INHIBITING POPCORN POLYMER FORMATION WITH TERTIARY AMINO NAPHTHOL COMPOUND
Harry Elmer Albert, Lafayette Hill, Pa., assignor to Pennsalt Chemicals Corporation, Philadelphia, Pa., a corporation of Pennsylvania
No Drawing. Filed May 13, 1968, Ser. No. 728,770
Int. Cl. C07c 7/18; C08d 5/00
U.S. Cl. 260—666.5        10 Claims

ABSTRACT OF THE DISCLOSURE

Popcorn polymer formation in processes for preparing synthetic rubber is inhibited by contacting the monomers with a tertiary amino naphthol compound of the structure

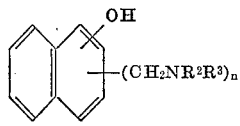

where $R^2$ and $R^3$ are alkyl radicals, $\beta$-hydroxyalkyl radicals, and oxydiethylene when $R^2$ and $R^3$ together form a single radical; and $n$ is 1 or 2.

---

This invention relates to the inhibition of the undesirable polymerization of olefinic monomers which gives rise to popcorn polymers and is particularly concerned with the use of certain tertiary amino naphthol compounds and derivatives as popcorn polymer inhibitors in processes relating to the preparation of synthetic rubber.

In the preparation of synthetic rubber from such intermediates as styrene and butadiene (e.g. SBR elastomers) undesirable spontaneous polymerization often occurs in the recovery systems for the olefinically unsaturated monomers. Polymerization may occur to form either a clear, solid, aromatic solvent soluble polymer or to form an entirely different cross-linked insoluble polymer, known, because of its appearance, as popcorn polymer. While both types of this self-polymerization are objectionable, the popcorn polymer, which is predominantly formed, is particularly undesirable because it is self-propagating in the presence of the monomer vapor or liquid and not only rapidly fouls the equipment, but is very difficult to remove and control. When such popcorn polymers do form it frequently becomes necessary to disassemble the equipment and mechanically remove the accumulations of unwanted polymer.

Much work has been done to find suitable inhibitors to prevent popcorn polymer formation. Nitrites and nitroso compounds have been found to be effective as have $NO_2$, $N_2O_3$, certain phenolic compounds, sulfur and some aromatic amines. However, most of these agents leave something to be desired for commercially effective use. Some of the agents are difficult to handle; others introduce colored impurities into the recovered olefins; some, although having the desired properties, are too expensive to be of commercial utility. One of the major objections to most of the previously used popcorn polymer inhibitors is their ineffectiveness in the presence of seed; that is, where clean equipment is used, the prior art inhibitors will reduce the tendency for popcorn polymer to form, but once a popcorn polymer seed is formed the inhibitors lose effectiveness. As will be seen, this invention provides popcorn ploymer inhibitors which retain their inhibiting properties even when popcorn polymer seed is in the system.

Because of the uniqueness of the popcorn polymer and the manner in which it is formed, there is no correlation between popcorn polymer inhibition and monomer stabilizers useful to prevent the premature polymerization of olefins during shipping and storage. Accordingly, many agents reported to be stabilizers for olefinic monomers are not as effective as popcorn polymer inhibitors. Thus, the problem of popcorn polymer formation in the manufacture of synthetic rubber is peculiar to the monomer recovery system where the monomers are recovered by distillation.

The conventional closed system for the emulsion polymerization of butadiene with styrene (a representative synthetic rubber) comprises a conventional reaction vessel equipped with a stirring mechanism and necessary heating or cooling means in which the monomers are caused to polymerize. After a suitable degree of polymerization is achieved, the polymerization reaction is stopped by the addition of a suitable short stopping agent. The resulting polymer latex is then allowed to flow into a flash tank which is at or slightly above atmospheric pressure and at which time most of the residual butadiene is removed from the latex. The gaseous butadiene is then removed from the flash tank and liquified for reuse. The butadiene degassed latex is then allowed to flow into a conventional vacuum flash tank where further butadiene and other dissolved gaseous materials are removed. The vacuum flash tank is maintained at a temperature of bout 100° F. It is in this vacuum flash tank that the most ideal conditions for popcorn polymer formation exist because the tank is at the proper temperature; the atmosphere above the level of latex contained in the tank contains about 2% or less of butadiene; and a certain amount of catalyst has vaporized and collected on the inner exposed metal surfaces of the tank above the level of the latex. These conditions will initiate popcorn polymer. The popcorn polymer will continue to grow as long as it is fed by a new supply of latex containing a small proportion of butadiene and other polymerizable monomer, such as styrene. The pipe lines leading to and from this vacuum flash tank are also ideal areas for popcorn polymer formation.

The latex is then pumped from the vacuum flash tank to a conventional styrene stripping column where the latex is passed counter-current to a rising stream of steam causing the styrene to be removed from the latex where it is then recirculated in a conventional manner to the reaction vessel for polymerization with butadiene. In the styrene stripping column popcorn polymer formation also tends to develop unless some precautions are taken to prevent its development.

Preferably, the inhibitor is added to a flash tank used in the process. However, the inhibitor may be introduced to the monomer at any stage in the manufacture of synthetic rubber, as for example during the manufacture, handling, storage, etc. of the intermediates. For example, the inhibitor can be introduced as the gaseous monomer is being passed through pipes, it can be mixed with the monomer in process tanks, or, as indicated, it can be introduced during the fractional distillation of materials in the recovery systems of the rubber manufacturing process. In the preferred technique it is considered best to feed the monomer into a flash tank or fractional distillation column of conventional type. The monomer is subject to fractional distillation using conventional reboiling at the bottom of the column and withdrawal of overhead material at the top, condensing the overhead material and returning a portion of it to the top of the column as reflux. The inhibiting solution is continuously fed, preferably by spraying its solution in water or monomer into the upper portion of the column through which it descends. In other techniques the inhibitor can be introduced to one or more of the monomers in any phase wherein the monomer is being circulated in the process.

The concentration at which the inhibitor is used will usually range from 0.001 to about 5.0 percent by weight of the total monomers (i.e. about 10 to 50,000 parts per million parts of monomer). At concentrations below this value the inhibiting effects are too small to be of significant value. On the other hand, greater amounts may be used, say up to 20%, but such large amounts are not required and are simply wasteful of inhibitor.

The tertiary amino naphthol compounds and derivatives which are used to effectively inhibit popcorn polymer formation according to this invention have the formula

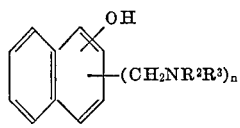

wherein $R^2$ and $R^3$ are selected from the group consisting of alkyl radicals having one to five carbon atoms, $\beta$-hydroxyalkyl radicals having one to five carbon atoms, and oxydiethylene when $R^2$ and $R^3$ together form a single radical; and $n$ is 1 or 2.

Representative of the preferred compounds useful in this invention are:

1-dimethylaminomethyl-2-naphthol
1-diethylaminomethyl-2-naphthol
1-di-n-butylaminomethyl-2-naphthol
1-di($\beta$-hydroxyethylaminomethyl)-2-naphthol
1-N-ethyl-N-$\beta$-hydroxyethylaminomethyl-2-naphthol
4-(dimethylaminomethyl)-1-naphthol
2,4-bis(dimethylaminomethyl)-1-naphthol
1-morpholinomethyl-2-naphthol
2-morpholinomethyl-1-naphthol
2,4-di(morpholinomethyl)-1-naphthol
2-di-$\beta$-hydroxyethylaminomethyl-1-naphthol
1-di($\beta$-hydroxypropyl)aminomethyl-2-naphthol
2-di($\beta$-hydroxypropyl)aminomethyl-1-naphthol
2,4-bis(di-$\beta$-hydroxyethylaminomethyl)-1-naphthol
2-dibutylaminomethyl-1-naphthol
2,4-bis(dibutylaminomethyl)-1-naphthol
1-diamylaminomethyl-2-naphthol Also useful are the equivalent water-soluble salts of the aforedescribed compounds such as the oxalate, acetate, maleate, citrate, glycolate salts, and the like. The salts are sometimes advantageous because of their ready solubility in aqueous latex media.

The tertiary amino naphthol compounds used in this invention are readily obtained by the well-known Mannich reaction involving the reaction of naphthol starting material with a secondary amine and formaldehyde. Such methods of preparing the compounds are described by J. H. Buckhalter et al., J. Am. Chem. Soc. 68, p. 1894 (1946); H. R. Snyder et al., J. Am. Chem. Soc. 70, p. 4230 (1948); and R. L. Shriner et al., J. Am. Chem. Soc. 68, p. 946 (1946).

It is to be understood that the specific tertiary amino compounds embodied herein can be used generally to prevent popcorn polymers in the preparation of polymers and copolymers such as those obtained from ethylenically unsaturated monomers. For homopolymers, the unsaturated monomer will be a conjugated diolefin. The useful conjugated diolefins are exemplified by butadienes such as butadiene-1,3, isoprene, cyanobutadiene-1,3, chloroprene, 2-phenylbutadiene, 2,3-dimethylbutadiene-1,3, and the like. The copolymerizable monomer used in copolymer formation and which will normally comprise up to about 70% of the mixture will be a mono-olefin containing a single $CH_2=CH-$ group having at least one of the free valence bonds attached to an electronegative group. Such olefins include aromatic olefins such as styrene, vinyl-naphthalene, $\alpha$-methylstyrene, p-chlorostyrene, etc.; the carboxy containing monomers and the corresponding esters, nitriles, and amides such as acrylic acid, methacrylic acid, methylmethacrylate, acrylonitrile, methacrylamide, and the like. Preferably, this invention will be used in recovering the monomers used to make any butadiene-based polymer latex.

The following illustrative examples are set forth for evaluation of the unusual effectiveness of the compounds of this invention as popcorn polymer inhibitors. The technique used for measuring inhibiting effectiveness was as follows:

A one-half gram sample of popcorn polymer seed from a styrene-butadiene rubber (SBR) plant flash tank (formed from styrene containing a small amount of butadiene) was placed in a seven ounce bottle previously flushed with nitrogen and containing 30 ml. of freshly distilled styrene. The bottle was capped with a self-sealing cap and 1 ml. of liquid butadiene and the inhibitor was added through the cap with a hypodermic syringe.

The inhibitor concentration was 0.1% by weight of the monomers. The bottles were kept at the elevated temperature of 140° F. and observed until popping (i.e. polymerization and formation of popcorn polymer) was found. The number of days required for this condition to occur was recorded. The data are reported in Table I which follows.

TABLE I

| Ex. No. | Inhibitor compound | Structural formula | Days for popcorn polymer formation |
|---|---|---|---|
| 1 | None | | 1 |
| 2 | 1-diethylamino-methyl-2-naphthol | (structure with $CH_2N(C_2H_5)_2$, OH on naphthalene) | 12 |
| 3 | 1-dimethylamino-methyl-2-naphthol | (structure with $CH_2N(CH_3)_2$, OH on naphthalene) | 22 |
| 4 | 1-morpholino-methyl-2-naphthol | (structure with $CH_2N$-morpholino, OH on naphthalene) | 15 |

The foregoing results show that compounds embodied in my invention give outstanding results, which are in contrast to the poor performance of various closely related phenolic compounds which impart slight or no inhibition to popcorn polymer formation, for example, such closely related compounds as:

2-diethylaminomethylphenol
2-diethylaminomethyl-4-t-amylphenol
2-dimethylaminomethylphenol
2-diethylaminomethyl-4-nitrophenol
2-diethylaminomethyl-4-chlorophenol
2-dimethylaminomethyl-4-methyl-6-t-butylphenol
2-dimethylaminomethyl-4-t-amylphenol
2-(N-ethyl-N-$\beta$-hydroxyethylaminomethyl)-4-t-amylphenol
2-(morpholinomethyl)-4-t-amylphenol
2,6-bis(dimethylaminomethyl)-4-t-amylphenol
2-(di-n-butylaminomethyl)-4-t-amylphenol
2-dimethylaminomethyl-p-cresol Other valuable advantages of the inhibitors of this invention are their chemical stability and their moderate propensity to cause discoloration of the synthetic rubber. Undue discoloration of the rubber products has been a serious drawback of many of the previously used inhibitors.

I claim:

1. The method of inhibiting the formation of popcorn polymer in processes for the preparation of synthetic rubber from olefinic monomers which comprises contacting the monomers with an inhibiting amount of a tertiary amino naphthol compound having the structure

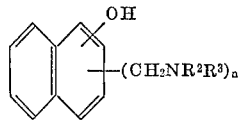

wherein $R^2$ and $R^3$ are selected from the group consisting of alkyl radicals having one to five carbon atoms, β-hydroxyalkyl radicals having one to five carbon atoms, and oxydiethylene when $R^2$ and $R^3$ together form a single radicals; and $n$ is 1 to 2.

2. The method of claim 1 wherein the inhibitor is 1-dimethylaminomethyl-2-naphthol.

3. The method of claim 1 wherein the inhibitor is 1-diethylaminomethyl-2-naphthol.

4. The method of claim 1 wherein the inhibitor is 1-di-n-butylaminomethyl-2-naphthol.

5. The method of claim 1 wherein the inhibitor is 1-di(β-hydroxyethylaminomethyl)-2-naphthol.

6. The method of claim 1 wherein the inhibitor is 1-N-ethyl-N-β-hydroxyethylaminomethyl-2-naphthol.

7. The method of claim 1 wherein the inhibitor is 4-(dimethylaminomethyl)-1-naphthol.

8. The method of claim 1 wherein the inhibitor is 2,4-bis(dimethylaminomethyl)-1-naphthol.

9. The method of claim 1 wherein the inhibitor is 1-morpholinomethyl-2-naphthol.

10. The method of claim 1 wherein the inhibitor is 2-dibutylaminomethyl-1-naphthol.

References Cited

UNITED STATES PATENTS

| 2,326,440 | 4/1941 | Craig | 260—681.5 |
| 2,510,847 | 6/1950 | Wilson | 202—57 |
| 2,326,440 | 8/1943 | Craig | 260—681.5 |

OTHER REFERENCES

J. H. Buckhalter et al.: J. Am. Chem. Soc. 68, p. 1894 (1946).

H. R. Snyder et al.: J. Am. Chem. Soc. 70, p. 4230 (1948).

R. L. Shriner et al.: J. Am. Chem. Soc. 68, p. 946 (1946).

DELBERT E. GANTZ, Primary Examiner

J. M. NELSON, Assistant Examiner

U.S. Cl. X.R.

260—84.7, 94.7, 681.5